(12) United States Patent
Hattori et al.

(10) Patent No.: US 8,085,489 B2
(45) Date of Patent: Dec. 27, 2011

(54) METHOD FOR WRITING SERVO PATTERNS AND DISK DRIVE INCLUDING A CONTROLLER FOR WRITING SERVO PATTERNS ACCORDING TO THE METHOD

(75) Inventors: Ryohheita Hattori, Kanagawa (JP); Masaki Yoshioka, Kanagawa (JP); Suthasun Thambirajah, Kanagawa (JP); Minoru Hashimoto, Kanagawa (JP); Kei Yasuna, Kanagawa (JP)

(73) Assignee: Hitachi Global Storage Technologies, Netherlands B.V., Amsterdam (NL)

( * ) Notice: Subject to any disclaimer, the term of this patent is extended or adjusted under 35 U.S.C. 154(b) by 0 days.

(21) Appl. No.: 12/538,039

(22) Filed: Aug. 7, 2009

(65) Prior Publication Data
US 2010/0033868 A1 Feb. 11, 2010

(30) Foreign Application Priority Data
Aug. 7, 2008 (JP) ................................ 2008-204899

(51) Int. Cl.
*G11B 21/02* (2006.01)
*G11B 5/596* (2006.01)
(52) U.S. Cl. ........................................ 360/75; 360/77.08
(58) Field of Classification Search ........................ None
See application file for complete search history.

(56) References Cited

U.S. PATENT DOCUMENTS

| 6,108,156 | A | 8/2000 | Lee et al. |
|---|---|---|---|
| 6,888,696 | B2 | 5/2005 | Yasuna et al. |
| 2004/0125491 | A1* | 7/2004 | Iseri et al. ........................ 360/75 |
| 2007/0247741 | A1 | 10/2007 | Akagi et al. |
| 2008/0002278 | A1 | 1/2008 | Ueda et al. |

FOREIGN PATENT DOCUMENTS

| JP | 06096541 | 4/1994 |
|---|---|---|
| JP | 2006/344265 | 12/2006 |
| JP | 2007/287252 | 11/2007 |
| JP | 2008/010121 | 1/2008 |

* cited by examiner

*Primary Examiner* — Andrew L Sniezek

(57) ABSTRACT

A method for writing servo patterns onto a disk of a disk drive. The method includes providing a plurality of different drive currents for an actuator while pushing the actuator into a crash stop defining a swing range of the actuator. The method also includes performing a write operation for at least one of the plurality of different drive currents to write a plurality of servo pattern tracks including a plurality of separate servo pattern sectors. Furthermore, the method includes gradually changing a drive current of the plurality of different drive currents while pushing the actuator into the crash stop so as to gradually move a read element in searching for a servo pattern track to a radial position different from a radial position of the write element. Moreover, the method includes positioning the read element at one of the plurality of servo pattern tracks.

16 Claims, 7 Drawing Sheets

METHOD FOR WRITING SERVO PATTERNS AND DISK DRIVE INCLUDING A CONTROLLER FOR WRITING SERVO PATTERNS ACCORDING TO THE METHOD

CROSS-REFERENCE TO RELATED APPLICATION

This application claims priority from the Japanese Patent Application No. 2008-204899, filed Aug. 7, 2008, the disclosure of which is incorporated herein in its entirety by reference.

TECHNICAL FIELD

Embodiments of the present invention relate to a method for writing servo patterns in a disk drive and a disk drive including a controller for writing servo patterns according to the method.

BACKGROUND

A hard disk drive (HDD) positions a magnetic-recording head by servo control using servo patterns on a magnetic-recording disk and writes data to, or reads data from, the magnetic-recording disk at an address designated by a host. An operation for writing servo patterns to magnetic-recording disks is called servo writing; and, servo writing is generally performed in the manufacturing of the HDD. As one type of a servo write operation, self-servo writing (SSW) is known which reads out data written by the HDD, itself, for head positioning and timing control to write servo patterns to magnetic-recording disks.

Development and design engineers engaged in the design of HDD technology are ever vigilant for more efficient and reliable methods for writing servo patterns to magnetic-recording disks. In particular, SSW is one technique for writing servo patterns to magnetic-recording disks which is very efficient, because SSW does not require the utilization of a separate servo writing tool to write servo patterns. However, the reliance of SSW on previously written servo patterns for the writing of subsequent servo patterns creates the potential for registration errors in the servo writing process, which can substantially lengthen the servo writing process in attempts to recover from such registration errors. Therefore, HDD development and design engineers are interested in refining the SSW process to eliminate such sources of error.

SUMMARY

Embodiments of the present invention include a method for writing servo patterns onto a disk of a disk drive. The method includes providing a plurality of different drive currents for an actuator while pushing the actuator into a crash stop defining a swing range of the actuator. The method also includes performing a write operation for at least one of the plurality of different drive currents with a write element to write a plurality of servo pattern tracks including a plurality of separate servo pattern sectors. Adjacent tracks in the plurality of servo pattern tracks are separated in a radial direction. Furthermore, the method includes gradually changing a drive current of the plurality of different drive currents while pushing the actuator into the crash stop so as to gradually move a read element in searching for a servo pattern track to a radial position different from a radial position of the write element. Moreover, the method includes positioning the read element at one of the plurality of servo pattern tracks.

DESCRIPTION OF THE DRAWINGS

The accompanying drawings, which are incorporated in and form a part of this specification, illustrate embodiments of the invention and, together with the description, serve to explain the embodiments of the present invention.

Figure 1:
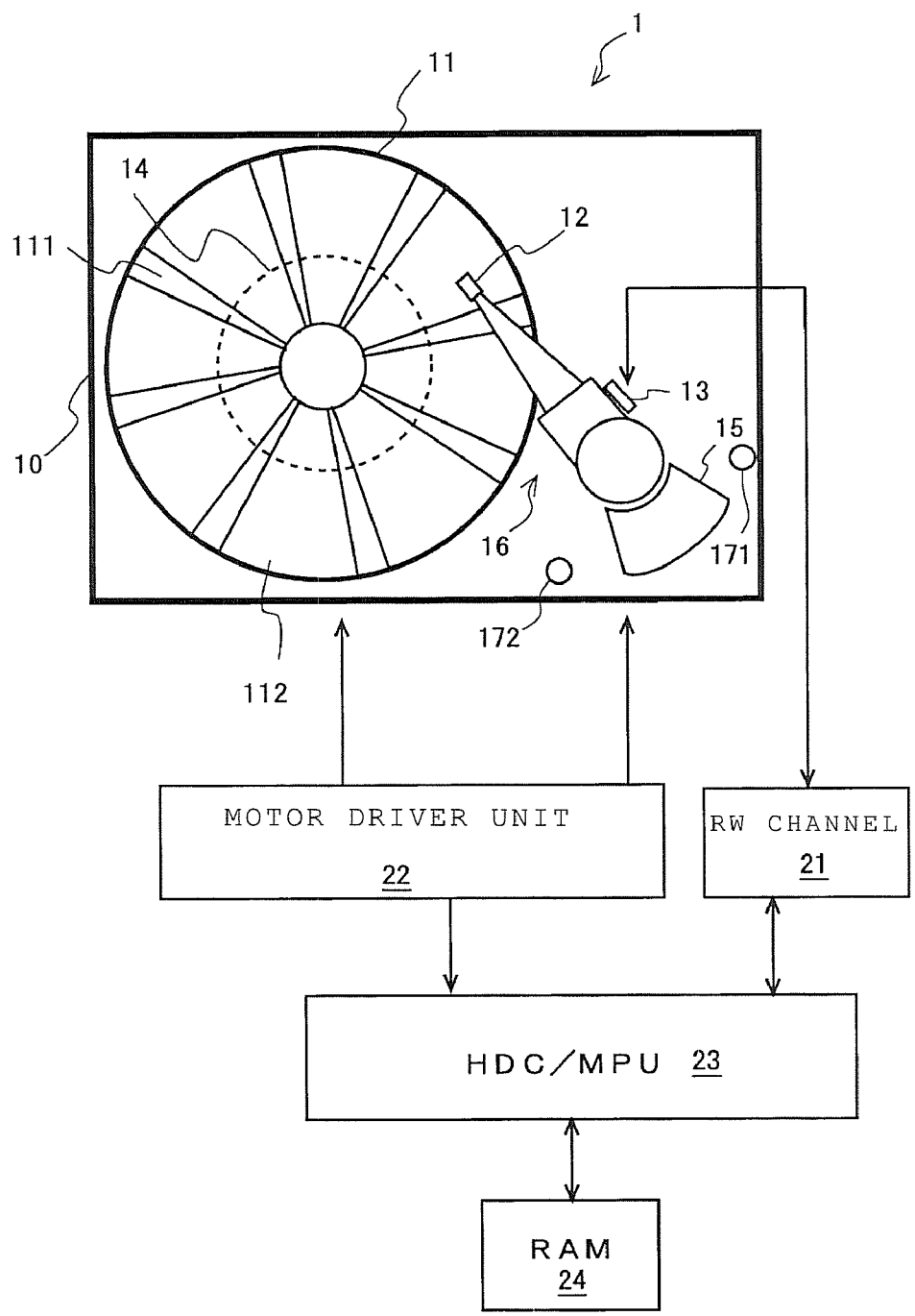
FIG. 1 is a an example block diagram schematically depicting the configuration of a hard disk drive, in accordance with an embodiment of the present invention.

The drawings referred to in this description should not be understood as being drawn to scale except if specifically noted.

DESCRIPTION OF EMBODIMENTS

Reference will now be made in detail to the alternative embodiments of the present invention. While the invention will be described in conjunction with the alternative embodiments, it will be understood that they are not intended to limit the invention to these embodiments. On the contrary, the invention is intended to cover alternatives, modifications and equivalents, which may be included within the spirit and scope of the invention as defined by the appended claims.

Furthermore, in the following description of embodiments of the present invention, numerous specific details are set forth in order to provide a thorough understanding of the present invention. However, it should be noted that embodiments of the present invention may be practiced without these specific details. In other instances, well known methods, procedures, and components have not been described in detail as not to unnecessarily obscure embodiments of the present invention. Throughout the drawings, like components are denoted by like reference numerals, and repetitive descriptions are omitted for clarity of explanation if not necessary. Embodiments of the present invention are described for a hard-disk drive (HDD) including a magnetic-recording head and a magnetic-recording disk, by way of example without limitation thereto, as an example of a disk drive including a head and a disk for the recording of information, as a disk drive including a head and a disk for the recording of information is within the spirit and scope of embodiments of the present invention.

DESCRIPTION OF EMBODIMENTS OF THE PRESENT INVENTION FOR A METHOD FOR WRITING SERVO PATTERNS AND A DISK DRIVE INCLUDING A CONTROLLER FOR WRITING SERVO PATTERNS ACCORDING TO THE METHOD

In accordance with embodiments of the present invention, for writing new servo patterns to the disks in self-servo writing (SSW), the HDD writes servo patterns for head positioning and timing patterns for measuring the timing of writing new servo patterns. The servo patterns written by the HDD include servo patterns used in reading and writing operations corresponding to commands from a host, which are subsequently referred to herein by the term of art "product servo patterns," and patterns used for servo control in SSW. As used herein, the terms of art "servo pattern," or "servo patterns," refers to a pattern, or patterns, respectively, for head positioning, which is provided by positioning of the actuator, and include both a product servo pattern, or patterns, respectively, and a pattern, or patterns, respectively, used for servo control in SSW.

In accordance with embodiments of the present invention, SSW performs timing control with timing patterns and writes new servo patterns while reading out servo patterns written by the HDD itself for head positioning. The HDD repeats such a propagation process of servo patterns. A read element and a write element on a head-slider are present at different radial positions of the magnetic-recording disk and the read element may read servo patterns written with the write element. Typically, the read element is offset from the write element in a substantially radial direction of the magnetic-recording disk. For example, the read element may be offset closer to the inside diameter of the magnetic-recording disk than the write element; for this arrangement, the read element reads out servo patterns written with the write element and the write element writes a new servo track at the outer side, in other words, at a location offset towards the outside diameter of the magnetic-recording disk relative to the position of the read element. As used herein, the term of art, "inner side," refers to the a portion of the magnetic-recording disk, or a portion of a servo pattern on the magnetic-recording disk, that is disposed towards the inside diameter of the magnetic-recording disk; the term of art, "outer side," refers to the a portion of the magnetic-recording disk, or a portion of a servo pattern on the magnetic-recording disk, that is disposed towards the outside diameter of the magnetic-recording disk.

In accordance with embodiments of the present invention, as no servo patterns exist on a recording surface of a magnetic-recording disk before a write element writes servo patterns, initially, the HDD can not carry out head positioning by servo patterns of the magnetic-recording disk. In a conventional servo write operation, a HDD initially positions the head-slider above the magnetic-recording disk using a crash stop. The HDD applies a constant current to a voice coil motor (VCM) driving the actuator supporting the head-slider to push the actuator into an inner crash stop firmly. The actuator stays at a position where the VCM drive force and the elastic force of the inner crash stop are in balance. The HDD maintains a constant VCM current and writes servo patterns with a write element to write an entire servo track. If the VCM current is reduced, the VCM drive force is reduced; the elastic force of the inner crash stop becomes larger than the VCM drive force; and, the actuator and the head-slider supported by the actuator move towards the outside diameter, the outer side, of the magnetic-recording disk. The actuator stops at a position where the newly set VCM drive force and the elastic force of the inner crash stop are in balance In accordance with embodiments of the present invention, as described above, the read element is present offset from the write element in a substantially radial direction of the magnetic-recording disk. For example, the read element may be offset closer to the inside diameter, the inner side, of the magnetic-recording disk than the write element for this arrangement, if the VCM current is reduced gradually, the read element moves gradually toward the outside diameter, the outer side, of the magnetic-recording disk and reaches a servo track already written. The HDD performs servo control of the actuator, which performs head positioning, by use of the servo patterns read with the read element. For servo control of the actuator, which determines the position of the head-slider, the read element reads servo patterns precisely and follows the target position within the servo track. For the head-slider to follow the target position, the head-slider detects servo patterns periodically. The HDD performs the timing control for servo control based on the servo address marks (SAMs) in servo patterns detected by the head-slider. The condition in which the SAMs in servo patterns may be found successively and the timing control for servo control may be performed periodically and with stability is referred to by the term of art, "locked state."

In accordance with embodiments of the present invention, the position of the actuator pushed into the crash stop depends on parameters such as the elastic force of the crash stop, the bias force of a flexible printed circuit and the proportionality coefficient of the VCM drive force to the VCM drive current. These parameters generally do not exhibit precise reproducibility and may change depending on environmental conditions such as temperature and humidity. In addition, recent HDDs with high recording density have a narrow product servo track width of no more than 200 nm. Thus, when a HDD writes the first servo track on a recording surface of a magnetic-recording disk and then changes the VCM current step by step, in increments, for reading the servo track with a read element, the read element may pass over the servo track without the HDD finding the servo track. Moreover, even if the HDD finds the servo track with the read signal output from the read element, the position that the read element reads out first in the servo track changes every time that the VCM current changes in increments. This situation is next described in greater detail with reference to FIG. 7.

Figure 7:
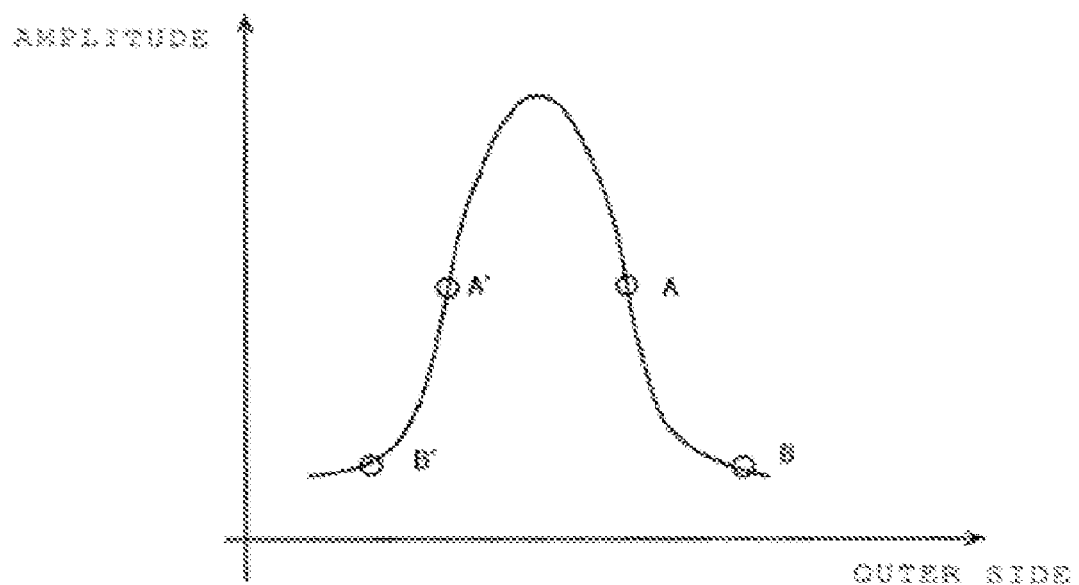
FIG. 7 is a drawing that illustrates an issue encountered when employing a conventional technique for self-servo writing (SSW).

Embodiments of the present invention address the situation depicted with the aid of FIG. 7. FIG. 7 depicts a read signal of a burst pattern. The X axis indicates the radial position and the Y axis indicates the signal amplitude. If the HDD changes the VCM current step by step, in increments, to move the read element outward, the first signal of the read element may be read at a point A, or a point B. Positions showing the same amplitude of the point A and the point B also exist located towards the inside diameter, the inner side, of the magnetic-recording disk; these positions are indicated by A' and B', respectively. The HDD can not determine whether the present position is at the point A, or the point A', when the HDD first receives a burst signal in the operation of changing the VCM current step by step. The same indeterminacy holds true for the points B and B'. Therefore, if the HDD moves the read element towards the outside diameter, the outer side, of the magnetic-recording disk in the operation of positioning the read element and reads out first the point A, or the point B, there exists the possibility of misidentifying the point A, or the point B, as the point A', or the point B', respectively. As a consequence of misidentification, the read element loses the burst pattern, and the HDD can not obtain the servo data. If the HDD can not find the servo track, or, as a result, the servo control becomes disabled, the HDD resets the VCM current to the initial value and searches for the servo track once again. To deal with this situation, embodiments of the present invention provide a technique to find servo patterns and to proceed with servo control more reliably through a head-positioning procedure that changes the VCM current in a systematic manner during the initial stages of SSW.

In accordance with embodiments of the present invention, a method is next described for writing servo patterns for servo control of the actuator in which the servo patterns are written onto the disk before writing product servo patterns that include information indicating addresses of user data. The method involves an operation to drive and control an actuator mounted in the disk drive in which the actuator is configured to rotate to move a head in the radial direction of a disk and to write servo patterns onto the disk with the head. The method provides a plurality of different drive currents for the actuator while pushing the actuator into a crash stop defining a swing range of the actuator. The method also performs a write operation at each, or alternatively, at least one, of the plurality of different drive currents with a write element to write a plurality of servo pattern tracks including a plurality of separate servo pattern sectors in which adjacent tracks in the plurality of servo pattern tracks are separated in the radial direction of the disk. Furthermore, the method gradually changes the drive current while pushing the actuator into the crash stop so as to gradually move a read element in searching for a servo pattern track to a radial position different from a radial position of the write element. Moreover, the method positions the read element at one of the plurality of servo pattern tracks. Thus, in the initial process of SSW, embodiments of the present invention may provide a method to more reliably find servo patterns and proceed with servo control by controlling a drive current of the actuator independent of servo patterns.

In one embodiment of the present invention, the method further includes writing new servo patterns with the write element while being positioned at each, or alternatively, at least one, of the inner edge and the outer edge of one of the plurality of servo pattern tracks. Thus, embodiments of the present invention may provide a method to write new a servo pattern with more layers.

In another embodiment of the present invention, the method further includes writing an identifier for identifying the servo pattern track in each, or alternatively, at least one, of the plurality of servo pattern tracks. The method allows the identification of each, or alternatively, at least one, track. Furthermore, in one embodiment of the present invention, each, or alternatively, at least one, of the servo pattern sectors includes fields similar to the product servo pattern, and the identifier is written in a track identification (ID) field of each, or alternatively, at least one, servo pattern sector. Thus, the original function of a field in the servo pattern may be utilized, in accordance with a method of embodiments of the present invention.

In one embodiment of the present invention, the method further includes writing an identifier in each, or alternatively, at least one, of the plurality of servo pattern tracks in which the identifier indicates that the servo pattern track is newly written in the on-going write process. Thus, the latest patterns may be identified and the identifier may be used as historical data of the writing. Furthermore, in one embodiment of the present invention, an identifier for identifying the servo pattern track and the identifier indicating that the servo pattern track is newly written in the on-going write process are in one field of a servo pattern. Embodiments of the present invention may provide a method which accomplishes the effective write and detection of each, or alternatively, at least one, identifier.

In another embodiment of the present invention, the method further includes performing an erasure operation with the write element before writing each, or alternatively, at least one, of the plurality of servo pattern tracks, and the write width in the erasure operation is larger than the write width in the writing of the plurality of servo pattern tracks. Embodiments of the present invention may provide a method which enables the writing of new servo patterns reliably.

In accordance with another embodiment of the present invention, a disk drive includes a disk, a head including a write element configured to write servo patterns onto the disk and a read element configured to read the servo patterns, an actuator configured to support the head and to rotate to move a head in a radial direction of the disk, and a controller configured to write servo patterns onto the disk. The servo patterns are configured to provide servo control of the actuator in the writing of the servo patterns onto the disk before writing product servo patterns that include information indicating addresses of user data. The controller is configured to execute an operation to drive and to control the actuator, and to write servo patterns onto the disk with the write element. The controller is configured to provide a plurality of different drive currents of the actuator while pushing the actuator into a crash stop defining a swing range of the actuator. The controller is also configured to perform a write operation at each, or alternatively, at least one, of the plurality of different drive currents with a write element to write a plurality of servo pattern tracks including a plurality of separate servo pattern sectors, in which adjacent tracks in the plurality of servo pattern tracks are separated in the radial direction of the disk. Furthermore, the controller is configured to gradually change the drive current while pushing the actuator into the crash stop so as to gradually move the read element in searching for a servo pattern track to a radial position different from a radial position of the write element. Moreover, the controller is configured to position the read element at one of the plurality of servo pattern tracks. Thus, in the initial process of SSW, embodiments of the present invention may provide a disk drive including a controller that more reliably finds servo patterns and proceeds with servo control by controlling a drive current of the actuator independent of servo patterns.

Thus, embodiments of the present invention may provide for more reliably finding servo patterns and proceeding to servo control by controlling a drive current of the actuator independent of servo patterns in the initial process of a self-servo-write operation. In accordance with another embodiment of the present invention, a HDD writes servo patterns on a magnetic-recording disk by SSW. SSW reads out servo patterns on a disk with a read element of the head-slider mounted in a HDD and, in a similar manner, positions the actuator located at a target position by servo control. The read element and the write element of a head-slider are present at different radial positions. The HDD writes servo patterns onto the disk with the write element. The HDD may write servo patterns over the entire surface of the disk by repeating the above processes.

In accordance with embodiments of the present invention, as subsequently described herein, patterns on a magnetic-recording disk used for servo control in head positioning are referred to by the term of art, "servo patterns." In accordance with embodiments of the present invention, as subsequently described herein, the servo patterns employed in SSW are of two types: product servo patterns for reading or writing data responsive to commands from a host, and servo patterns for writing the product servo patterns.

In accordance with embodiments of the present invention, an example is subsequently described herein in which a controller integrated with the HDD as a component thereof controls and performs the servo write. Although a dedicated servo writer, which may be incorporated as a discrete tool along a manufacturing line, may do the same operation, the example embodiment of the present invention accomplishes concurrent servo write operations of many HDDs without depending on a limited number of dedicated servo writers embedded in a manufacturing line. In accordance with embodiments of the present invention, the configuration of an HDD including such a controller is next described.

With reference now to FIG. 1, in accordance with an embodiment of the present invention, a HDD 1 includes a circuit board 20 fixed outside of a disk enclosure (DE) 10. On the circuit board 20, circuits are arranged, such as: a read and write channel (RW channel) 21; a motor driver unit 22; an integrated circuit (HDC/MPU) 23, which includes a hard-disk controller (HDC) and a microprocessor unit (MPU); and, a semiconductor-based random access memory (RAM) 24. In the DE 10, a spindle motor (SPM) 14 spins a magnetic-recording disk 11 at a specified rate of rotation, usually specified in revolutions per minute (rpm). The magnetic-recording disk 11 is a disk for storing data. As shown in FIG. 1, a magnetic-recording disk 11 is depicted on which product patterns have been already written. Multiple servo areas 111 are formed on the recording surface of the magnetic-recording disk 11 which extend in the radial direction from the center of the magnetic-recording disk 11 and are located discretely at specified angular positions on the magnetic-recording disk 11.

With further reference to FIG. 1, in accordance with an embodiment of the present invention, eight servo areas are shown. Product servo patterns for the positional control of a head-slider in reading and writing of the user data are recorded in each servo area 111. Data areas 112 each formed between two adjacent servo areas 111 are provided; and, user data are recorded in each data area 112. The servo areas 11 and the data areas 112 are provided alternately at specified angular positions on the magnetic-recording disk 11. The head-slider 12 includes a slider for flying over the magnetic-recording disk 11 and a magnetic-recording head for writing data to and reading data from the magnetic-recording disk 11. The head-slider 12 is secured at the distal end of an actuator 16. The actuator 16, which is a moving mechanism, is connected to the VCM 15 and rotates on a pivot shaft to move the head-slider 12 above the spinning magnetic-recording disk 11 along a substantially radial direction of the magnetic-recording disk 11. The range of motion of the actuator 16 is restricted by an inner crash stop 171 and an outer crash stop 172. The motor driver un it 22 drives the SPM 14 and the VCM 15 according to the control data from the HDC/MPU 23. An arm-electronics (AE) module 13 selects a head-slider 12 to access, to write data to or read data from, the magnetic-recording disk 11 from a plurality of head-sliders, of which head-slider 12 is an example, according to the control data from the HDC/MPU 23, and amplifies a read signal from, or alternatively, a write signal, to the magnetic-recording disk 11. The RW channel 21, during a read operation, extracts servo data and user data from the read signals obtained from the AE module 13 and decodes them. The decoded data is supplied to the HDC/MPU 23. The RW channel 21, during a write operation, code-modulates the write data supplied from the HDC/MPU 23, converts the code-modulated data into write signals, and then supplies them to the AE module 13.

With further reference to FIG. 1, in accordance with an embodiment of the present invention, in the HDC/MPU 23, the HDC is a logic circuit and the MPU works according to firmware loaded into the RAM 24. Data for controlling and for data processing are loaded into the RAM 24. The HDC/MPU 23 is an example of a controller, as described herein, and performs full control of the HDD 1 in addition to other processes associated with data processing, such as: head positioning control, interface control, and defect management. In accordance with embodiments of the present invention, the HDC/MPU 23 controls the execution of SSW. In accordance with one embodiment of the present invention, SSW is principally divided into the write process of initial patterns and the subsequent self-propagation process. In accordance with another embodiment of the present invention, SSW includes the write process of initial patterns. Before describing details of the write process of initial patterns, the self-propagation process is next described.

With further reference to FIG. 1, in accordance with an embodiment of the present invention, the self-propagation process reads out servo patterns that have been recorded on the magnetic-recording disk 11 with the read element of the head-slider 12, positions the head-slider at a target position and writes new servo patterns on the magnetic-recording disk 11 with the write element of the head-slider 12. Repeating the process, the HDD 1 writes servo patterns over the entire recording surface of the magnetic-recording disk 11. As the read element and the write element are located at different radial positions relative to the magnetic-recording disk 11, the write element at a different radial position from the radial position of the read element may write new servo patterns while the read element is tracking servo patterns that the write element has already written. In the self-propagation process, the HDD 1, typically, selects one of the head-sliders, of which head-slider 12 is an example, and reads out patterns that have been recorded on the recording surface. In one embodiment of the present invention, the HDD 1 controls the actuator 16 by use of the signals read by the selected head-slider 12 and writes patterns on recording surfaces concurrently with all the head-sliders including the selected head-slider 12.

Figure 2:
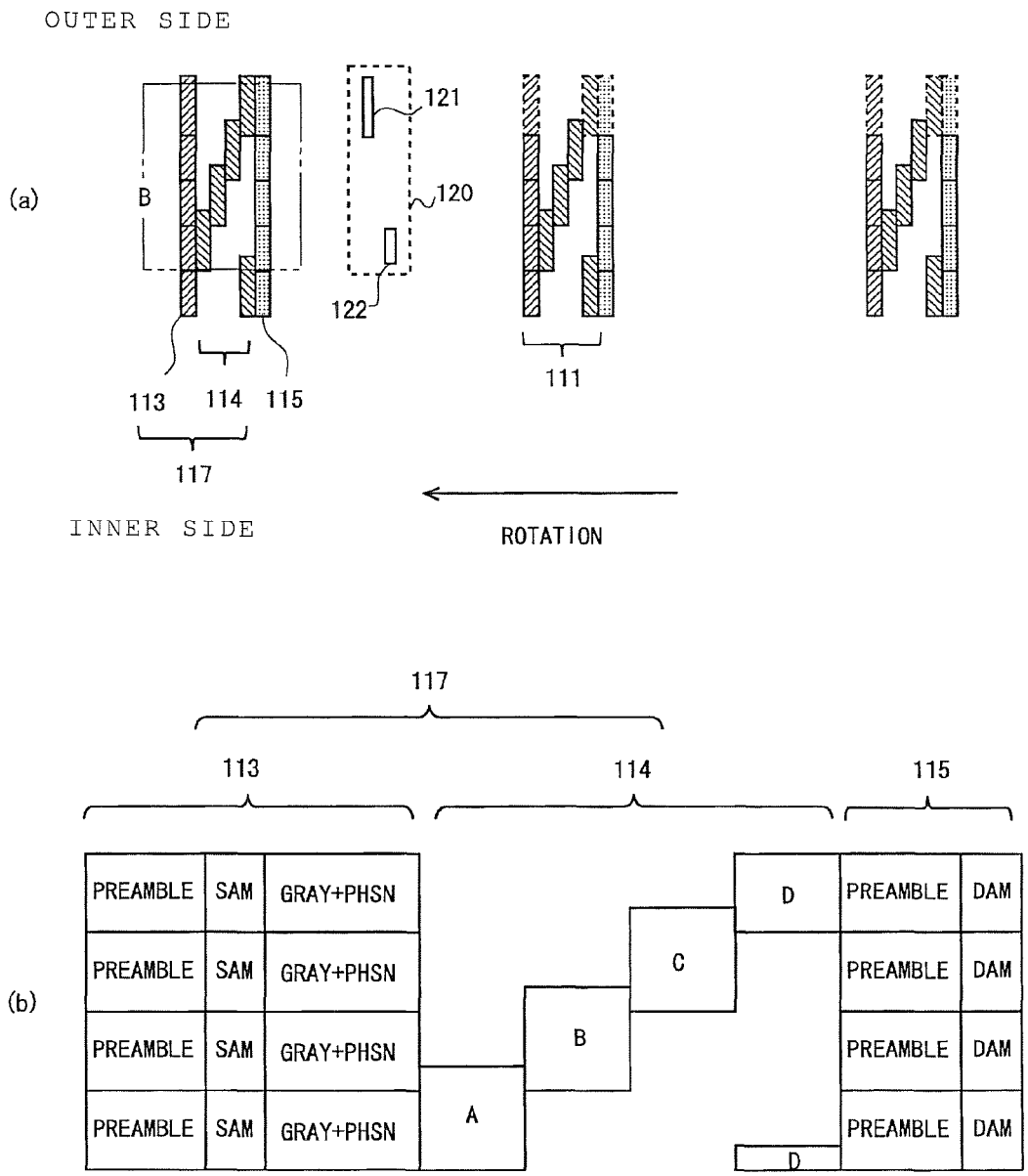
FIG. 2 illustrates an example magnetic-recording head on a head-slider and servo patterns on a magnetic-recording disk in a self-propagation process, in accordance with an embodiment of the present invention.

With reference now to FIG. 2(a), in accordance with an embodiment of the present invention, the magnetic-recording head 120 on the head-slider 12 and servo patterns on the magnetic-recording disk 11 of the self-propagation process are illustrated. The rotational direction of the magnetic-recording disk 11 is the direction from the right to the left on FIG. 2. The magnetic-recording head 120 has the read element 122 and the write element 121. The HDD 1 according to one embodiment of the present invention writes patterns from the inner side to the outer side in the self-propagation process, by way of example and without limitation thereto. In another HDD configuration, a HDD may write patterns from the outer side to the inner side. As shown in FIG. 2(a), the read element 122 is located closer to the inside diameter, the "inner side," of the magnetic-recording disk 11 than the write element 121. Servo patterns are written from the inner side to the outer side. Writing the servo patterns from the inner side enables the read element 122 to read the servo patterns written with the write element 121 in advance. Thus, the write element 121 may write a new pattern closer to the outside diameter, the "outer side," of the magnetic-recording disk 11 than the read element 122 while positioning the head-slider 12 by use of servo patterns read with the read element 122. In accordance with one embodiment of the present invention, the radial spacing between the write element 121 and the read element 122 is called read-write offset. Specifically, the read-write offset indicates the radial spacing between the centers of the write element 121 and the read element 122. The read-write offset varies depending on the radial position above the magnetic-recording disk 11. The circumferential positions of the write element 121 and the read element 122 may also differ. The spacing in the circumferential direction is called read-write separation.

With further reference to FIG. 2(a), in accordance with an embodiment of the present invention, the HDD 1 performs the positional control using servo patterns of the same format as product servo patterns used in operations responsive to commands from a host, by way of example and without limitation thereto. Using servo patterns of the same format as product servo patterns allows HDD 1 to carry out SSW by use of the functions implemented in the HDD 1 in the manufacture of HDD 1. Otherwise, HDD 1 may write servo patterns and timing patterns dedicated to SSW in addition to product servo patterns to write the product servo patterns. As used herein, the term of art, "product servo patterns," refers to the servo patterns that remain on the magnetic-recording disk 11 after formatting the magnetic-recording disk 11 and that are used subsequently in the manufactured product, a HDD, for accessing, writing data to or reading data from, the magnetic-recording disk 11 in accessing user data. For writing new servo patterns, servo patterns are provided for accurate positioning of the magnetic-recording head 120; and, timing patterns are provided which are the references for timing the writing of new servo patterns. As shown in FIG. 2(a), the servo patterns for positioning the magnetic-recording head 120 are the product servo patterns 117, which are servo patterns of the same format as the product servo patterns in accessing user data, as described above, and each of them includes a servo information section 113 and burst section 114. The servo patterns for positioning the magnetic-recording head 120 also include a timing pattern 115 that is disposed following and proximate to the burst section 114.

With reference now to FIG. 2(b), in accordance with an embodiment of the present invention, the pattern format of the portion in the rectangle B in FIG. 2(a) is shown. FIG. 2(b) depicts four pattern sectors that are radially arranged. A pattern of one sector includes the product servo pattern 117 and the timing pattern 115. FIG. 2(b) shows four product servo pattern sectors 117 and four timing pattern sectors 115. The HDD 1 writes multiple product servo pattern sectors 117 separated in the circumferential direction along a track. The sectors are continuous in the radial direction. The timing patterns are also continuous in the radial direction. The servo information section 113 of the product servo pattern 117 includes: fields of the preamble (PREAMBLE); the servo address mark (SAM); the track ID normally encoded with gray code (GRAY); and, the servo sector number (PHSN). The preamble is used for gain adjustment of a variable gain amplifier and waveform phase detection. The SAM is a section which indicates the start of actual information such as the track ID. The burst section 114 is a pattern indicating precise positions in the servo track designated by the track ID.

With further reference to FIG. 2(b), in accordance with an embodiment of the present invention, in the burst section 114, patterns are written at four different radial positions. The write element 121 writes a single pattern in the burst section 114 in a track. The pattern closest to the servo sector number is called pattern A and the following patterns are called pattern B, C, D, respectively. Each pattern has a width, which is the dimension in the radial direction, of the write element 121; and, the patterns A, B, C and D are displaced in the radial direction with respect to each other. The servo information sectors 113 overlap partially in the radial direction.

With further reference to FIG. 2(b), in accordance with an embodiment of the present invention, the timing pattern section 115 includes a portion of a data sector containing user data. The timing pattern section 115 allows the use of the functions of a control circuit of the HDD 1. The timing pattern section 115 includes the preamble (PREAMBLE) for waveform phase detection and the data address mark (DAM). The preamble provides precise synchronization with the waveform phases of patterns recorded on the magnetic-recording disk. Data sectors have user data subsequently recorded to the DAM. The HDC/MPU 23 uses the DAM as the timing reference for the servo writing. That is to say, the HDC/MPU 23 writes the pattern of the next sector using the detection timing of the DAM as the reference. The HDC/MPU 23 may use the SAM instead of the DAM as the timing reference. If the SAM is used, the timing pattern 115 may not be used; the product pattern 117 is then used and includes the timing pattern 115. The timing pattern 115 may be located ahead of the product pattern 117, instead of following the product pattern 117 as shown in FIGS. 2(a) and 2(b).

With further reference to FIGS. 2(a) and 2(b), in accordance with an embodiment of the present invention, as described above, in SSW, the HDD 1 refers to patterns written on the magnetic-recording disk 11 by the HDD 1, itself, and writes the succeeding patterns at positions displaced by the read-write offset from the written patterns in the radial direction while performing temporal control, which is a timing control for the circumferential direction, and spatial control, which is a positional control for the radial direction, using timing and spatial information gained from the signals of the patterns. In an embodiment of the present invention, the HDC/MPU 23 positions the head-slider 12 using the product servo patterns and controls the write timing of servo patterns using the DAMs as the reference patterns. As may be understood from the preceding discussion describing FIG. 2(a), the self-propagation process utilizes servo patterns arranged over the length corresponding to the read-write offset, which are referred to by the term of art, "cluster pattern," that are written on the magnetic-recording disk 11. The initial pattern writing process is a process for writing the initial patterns onto the disk in the self-propagation process.

With further reference to FIGS. 2(a) and 2(b), in accordance with an embodiment of the present invention, the initial pattern writing process corresponds to the start-up operation in the procedure of SSW. In the start-up operation, cluster patterns are formed. Each cluster pattern is formed of continuous patterns written in phase in the radial direction to have the width of one or more increments, in which an increment corresponds to the width of the track, and each of the patterns includes a servo pattern 117 with the same format as the product servo pattern and the timing pattern 115. The process records sequentially new cluster patterns of a width extended by one increment while being positioned at the cluster patterns. In the process, initial patterns of width larger than the read-write offset for the self-propagation process are formed. In an embodiment of the present invention, although the servo pattern and the timing pattern of the cluster pattern may be different from the servo pattern and timing pattern in the self-propagation process, the servo pattern and the timing pattern of the cluster pattern may be the same for a more efficient process. The operation for forming the initial patterns is carried out with the actuator 16 pushed into the inner crash stop 17, namely, the head-slider 12 positioned above the inner-most area of the magnetic-recording disk 11. Reduction of the VCM current to reduce the pushing force causes the actuator 16 and the attached head-slider 12 to move outward by the elastic force of the inner crash stop 171.

Figure 3:
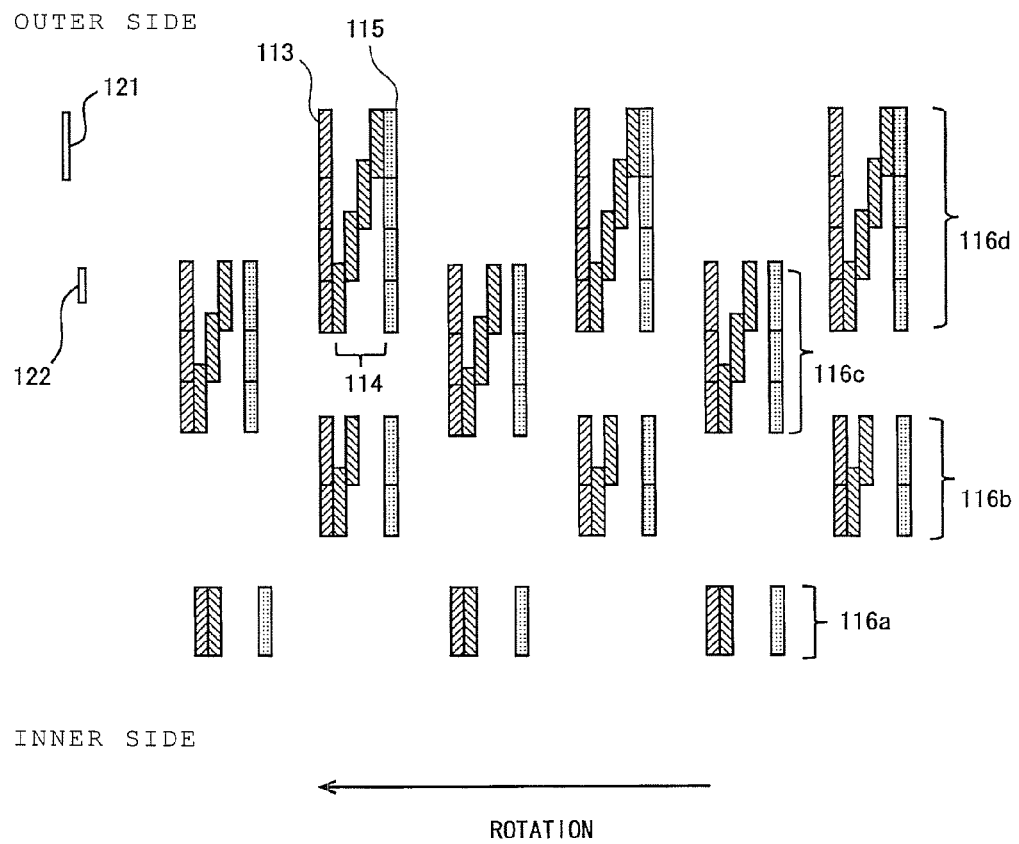
FIG. 3 illustrates an example arrangement of cluster patterns recorded in the inner-most area on the magnetic-recording disk, in accordance with an embodiment of the present invention.

With reference now to FIG. 3, in accordance with an embodiment of the present invention, the configuration of the cluster patterns 116a-116d recorded in the inner-most area of the magnetic-recording disk 11 is shown. The HDD 1 forms several tens to several hundreds of cluster pattern sectors in one rotation of the magnetic-recording disk 11. The number of the cluster patterns may be the same as, or different from, that of the product servo patterns formed upon completion of the servo write operation. FIG. 3 illustrates three sectors of several hundred cluster pattern sectors. The HDC/MPU 23 writes the cluster patterns sequentially starting from an inner side to increase the number of layers, a layer of which is identified with a track, herein, for example, one layer, or two layers, by controlling the actuator 16 and the head-slider 12. First, the HDC/MPU 23 writes the first cluster patterns 116a. Next, the HDC/MPU 23 positions the read element 122 at the cluster patterns 116a and writes the second cluster patterns 116b. The second cluster pattern is located at the outer position of the read-write offset separated from the first cluster pattern. The HDC/MPU 23 writes new patterns with the write element 121 while positioning the read element 122 at two points each displaced slightly from the center of the cluster patterns 116a. Thus, it forms the second cluster pattern of two layers 116b from the cluster pattern of single layer 116a.

With further reference to FIG. 3, in accordance with an embodiment of the present invention, the HDC/MPU 23 similarly positions the read element 122 at the second cluster patterns 116b to write the third cluster patterns 116c by use of the write element 121. Further, the HDC/MPU 23 positions the read element 122 at the third cluster patterns 116c to write the fourth cluster patterns 116d by use of the write element 121. In this way, the width, which is the dimension in the radial direction, of the cluster pattern is extended by increasing the number of layers, a layer of which is identified with a track. In the example of FIG. 3, the fourth cluster pattern 116d covers the width of read-write offset. The HDC/MPU 23 may use the fourth cluster patterns 116d as the initial patterns for the self-propagation process. When the HDC/MPU 23 writes outer cluster patterns by use of inner cluster patterns, the read element 122 is positioned at the inner edges of the inner cluster patterns first and the write element 121 writes servo patterns at outer positions determined by the read-write offset at a separate positions. Then, the read element 122 moves outward track by track above the inner cluster patterns and the write element 121 writes a new pattern at each position. Last, the read element 122 is positioned at the outer edges of the inner cluster patterns. Thus, the number of layers, a layer of which is identified with a track, of the cluster pattern increases gradually. The HDC/MPU 23 carries out positioning of the read element 122, through control of the VCM current, by use of servo signals read with the read element 122 while pushing the actuator 16 into the inner crash stop 171. An example of writing the second cluster patterns 116b by use of the first cluster patterns 116a is next described referring to the flowchart of FIG. 4.

Figure 4:
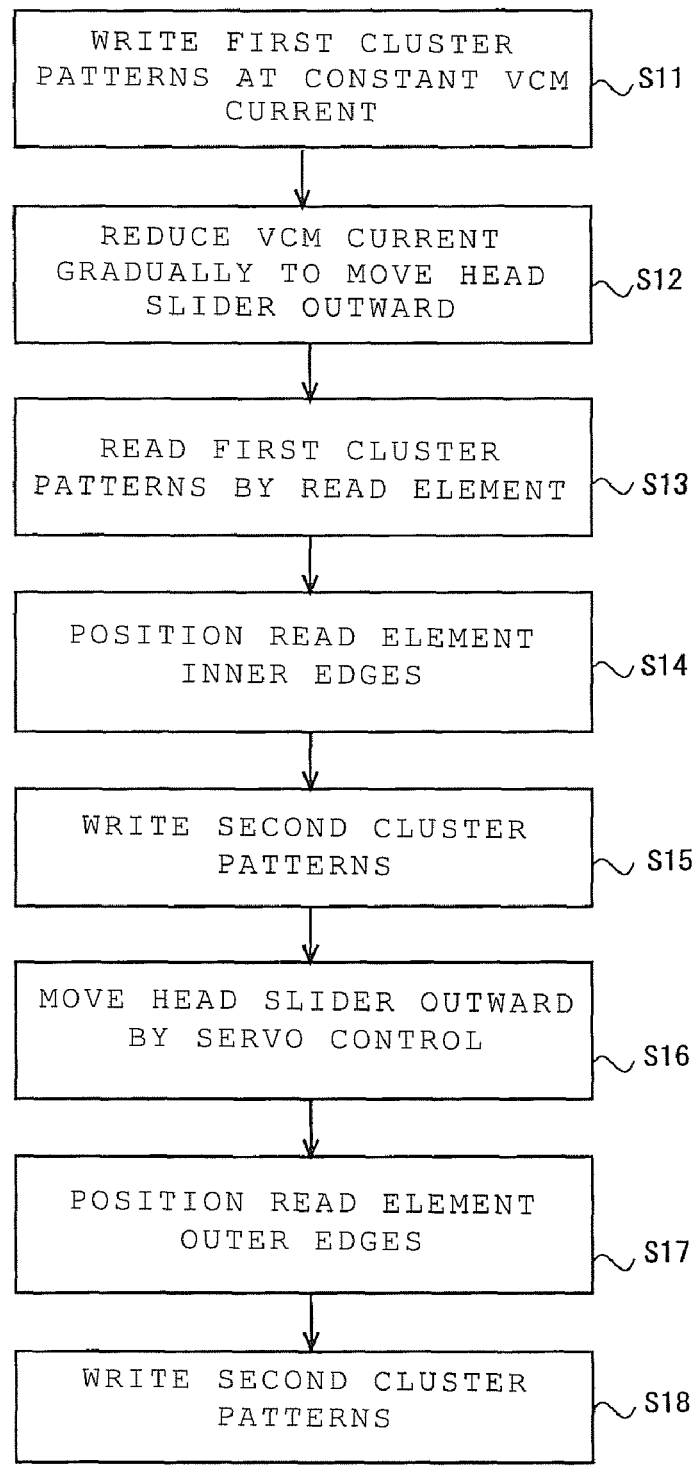
FIG. 4 is an example flowchart explaining an example of writing second cluster patterns by use of first cluster patterns, in accordance with an embodiment of the present invention.

With reference now to FIG. 4, in accordance with an embodiment of the present invention, at S11, the write element 121 writes the first cluster patterns 116a in one rotation of the magnetic-recording disk 11 at constant VCM current. Then, at S12, the HDC/MPU 23 gradually reduces the VCM current to move the head-slider 12 slowly outward. At S13, if the read element 122 reaches the written first cluster patterns 116a and is capable of reading out the waveforms, at S14, the HDC/MPU 23 moves to the positioning operation at the inner edges of the first cluster patterns 116a. At the inner edge, the amplitude of the burst is approximately half of the max value. At S15, if the read element 122 is locked at the inner edges of the first cluster patterns 116a and positioned precisely, the HDC/MPU 23 writes the inner track of the second cluster patterns 116b with the write element 121. As used herein, the term of art, "locked," refers to a state of HDD 1 wherein HDD 1 is capable of finding the SAMs of servo patterns successively and performing the timing control periodically and with stability for servo control. At S16, having completed the inner track of the second cluster patterns, the HDC/MPU 23 utilizes the amplitude from the bursts of the A pattern of the first cluster patterns 116a to move the head-slider 12 outward by servo control. At S17, the HDC/MPU 23 moves the read element 122 to the outer edges of the first cluster patterns 116a and positions the read element 122 at the outer edges of the first cluster patterns 116a. At the outer edge, the amplitude of the burst is approximately half of the max value. At S18, the HDC/MPU 23 writes the outer track of the second cluster patterns 116b with the write element 121 and the read element 122 positioned at the outer edges. The completion of the write of the outer track constitutes the completion of the formation of the entire track of the second cluster patterns 116b. The HDC/MPU 23 uses the amplitude of bursts in each track to position the read element 122 of the head-slider 12 in subsequent write processes of cluster patterns. The HDC/MPU 23 uses the amplitude of one or more bursts depending on the radial position for head positioning. The servo control using the bursts is the same as servo control employed for product servo patterns.

With further reference to FIG. 4, in accordance with an embodiment of the present invention, the HDC/MPU 23 starts to search for the first cluster patterns 116a, servo patterns, after writing the first cluster patterns 116a, as described above. In this search process, the HDC/MPU 23 gradually changes, for example, decreases, the VCM current to move the head-slider 12 in accordance with a preset manner independent of servo control. As no patterns exist at the inner side of the first cluster patterns 116a, the HDC/MPU 23 can not perform head positioning by signals read with the read element 122. The HDC/MPU 23 gradually changes the VCM current in preset increments to move the head-slider 12 slowly outward. For example, the HDC/MPU 23 may identify the VCM current level by digital value and decreases the VCM current in constant increments. However, the elastic force of the crash stop and the bias force of the actuator changes every time the actuator engages the crash stop, so the head-slider 12 exhibits a different movement every time the actuator engages the crash stop. Thus, there is a possibility that the HDC/MPU 23 can neither find the first cluster patterns 116a, nor position the read element 122 at the inner edges of the first cluster patterns 116a. Thus, in accordance with an embodiment of the present invention, the HDC/MPU 23 writes multiple tracks of the first cluster patterns 116a at different radial positions. Even if the read element 122 is not positioned at the first track of the first cluster patterns 116a and the read element 122 passes over the first track, the read element 122 may be positioned at any one of the other tracks. Thus, in accordance with an embodiment of the present invention, the read element 122 may be positioned more reliably at the inner edges of the first cluster patterns 116a.

Figure 5:
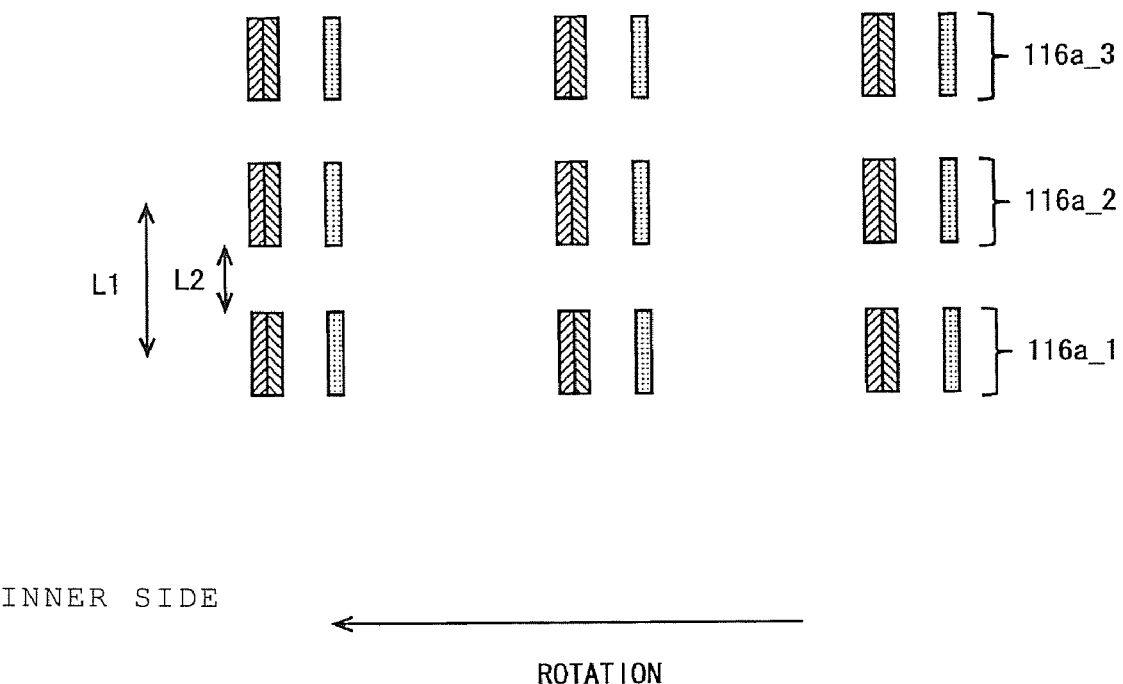
FIG. 5 illustrates an example portion of sectors in three tracks of first cluster patterns, in accordance with an embodiment of the present invention.

With reference now to FIG. 5, in accordance with an embodiment of the present invention, three tracks of the first cluster patterns 116a_1 to 116a_3. As shown in FIG. 5, the tracks are separated from each other in the radial direction with the spacing L1, which is the distance between the centers of adjacent tracks. The tracks have the same number of cluster pattern sectors and each sector circumferential position in a track agrees with sector circumferential position in the other tracks. In practical SSW, the HDC/MPU 23 can neither use servo control, nor perform the precise timing control. Therefore, the spacing between tracks is not necessarily constant nor is the spacing between sectors in a track constant. The HDC/MPU 23 may write a different number of cluster pattern sectors in the tracks. The HDC/MPU 23 writes cluster patterns 116a of a track while applying a constant VCM current to the VCM 15. If the value of the VCM current changes, the radial position of the head-slider 12 changes based on the relation between the pushing force of the actuator 16 and the elastic force of the crash stop. The HDC/MPU 23 writes a plurality of tracks of the cluster patterns 116a at different radial positions by providing a plurality of different VCM currents.

With further reference to FIG. 5, in accordance with an embodiment of the present invention, the HDC/MPU 23 applies different VCM currents preset by the design to the VCM 15. For example, the HDC/MPU 23 provides: the VCM current I1, first; the VCM current I2, next; and, the VCM current I3, last. The HDC/MPU 23 writes the tracks of the cluster patterns 116a_1 to 116a_3 at the VCM currents, respectively. I1 to I3 are set in the firmware of the HDC/MPU 23. The difference $\Delta 1$ between I1 and I2 is typically the same as the difference $\Delta 2$ between I2 and I3. Since the elastic force is not constant, the spacings between tracks may not be the same even if $\Delta 1$ and $\Delta 2$ are the same. If these values are small, however, the spacing between tracks is approximately constant.

With further reference to FIG. 5, in accordance with an embodiment of the present invention, the HDC/MPU 23 writes sectors with reference to timing signals of the SPM 14, which is the INDEX signal. The motor driver unit 22 provides the INDEX signal every rotation of the SPM 14. The HDC/MPU 23 measures the time to write sectors with the internal clock signal of the HDC/MPU 23, itself, with reference to the INDEX signals. The precision of the INDEX signal is low compared to the timing control in the self-propagation process and the timing control between the INDEX signals depends on the clock signal. Thus, the spacing between sectors is not constant and the sector positions between the tracks do not coincide.

With further reference to FIG. 5, in accordance with an embodiment of the present invention, the tracks of the cluster patterns 116a are separated in the radial direction from each other. The tracks of the cluster patterns 116a are separated in the radial direction, because there is a high possibility that the phases of the patterns do not agree with each other if two tracks partially overlap one another, since the write timing in the circumferential direction may not be precisely controlled, as described above. In addition, the first cluster patterns are single-layered for writing precise double-layered cluster patterns. In one embodiment of the present invention, the gap between adjacent tracks, namely the distance L2 between the opposed edges of the tracks is larger than the width of the read element 122, which is referred to by the term of art, "read width." The read width is the width of a burst, the amplitude of which the read element 122 may read out. The read width allows the read element 122 to read the cluster patterns 116a individually in each track, avoiding interference between waveforms of adjacent tracks.

With further reference to FIG. 5, in accordance with an embodiment of the present invention, if the HDC/MPU 23 reads multiple tracks of the cluster patterns 116a, the HDC/MPU 23 may identify each track. To identify each track, the cluster patterns 116a in each track include a track ID. A portion, or all, of the cluster patterns 116a in each track include the same track ID. In another embodiment of the present invention, all the cluster patterns 116a are provided with the track IDs so that detecting the track ID is performed easily and reliably. As described in the discussion of FIG. 2(b), the cluster pattern 116a includes a servo pattern 117 with the same format as the product servo pattern and a timing pattern 115 that includes a portion of a data sector. If the identifier of the track may be embedded in any one of the fields of the cluster pattern 116a, the data format is more efficient. Specifically, the SAM field of the servo information section 113, or alternatively, the track ID field, may store the track identifier. As the field of the sector number stores the sector number of the cluster pattern 116a, the track identifier is included in another field. In another embodiment of the present invention, the track ID field is utilized to include the track identifier of the cluster patterns 116a, as its original function is to include the servo track number. Any values may be used for identifying the tracks of the cluster patterns 116a, as long as the number of values is the same as that of the tracks. Thus, values not used in the product servo patterns used for the access of user data in the track ID field allows the use of available functions in the HDD 1 to facilitate identification of the tracks of the cluster patterns 116a. Otherwise, the track identifier of the cluster patterns 116a may be added behind the timing pattern section 115. In another embodiment of the present invention, if the product servo pattern has an additional field, like a repeatable runout field (RRO field), the track identifier may be written in the additional field.

Figure 6:
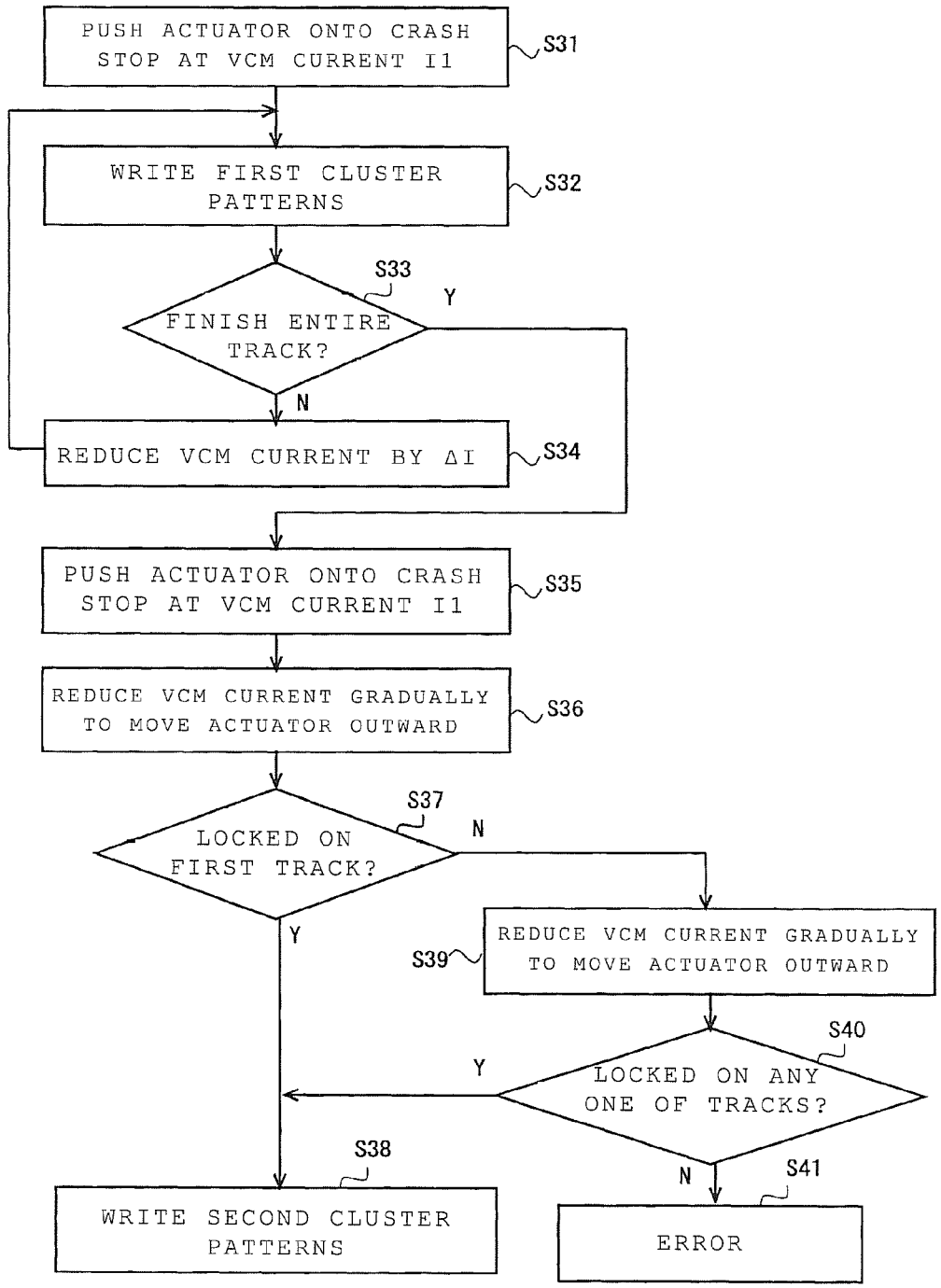
FIG. 6 is an example flowchart to explain an example operation for writing multiple tracks of single-layered cluster patterns and positioning a read element at one of the tracks, in accordance with an embodiment of the present invention.

With reference now to FIG. 6, in accordance with an embodiment of the present invention, an example flowchart of a write operation of multiple tracks of the first single-layered cluster patterns 116a and a positioning operation of the read element 122 at one of the tracks of the cluster patterns 116a is next described. First, at S31, the HDC/MPU 23 supplies the VCM current I1 to the VCM 15 to push the actuator 16 into the inner crash stop 171. The HDC/MPU 23 receives the INDEX signals from the motor driver unit 22 while maintaining the VCM current I1 constant. At S32, the HDC/MPU 23 counts the clock using the INDEX signal as the reference and writes the cluster pattern sectors 116a with the write element 121 at intervals corresponding to a fixed number of clock periods counted. At S34, upon completion of writing the first track of the cluster patterns 116a, the HDC/MPU 23, for writing the next track, corresponding to the N branch off of S33, reduces the VCM current by $\Delta 1$ from I1. The pushing force of the actuator 16 decreases and the actuator 16 is moved outward by the elastic force of the inner crash stop 171. The HDC/MPU 23 maintains the VCM current at the level I1−$\Delta$I, and writes each cluster pattern 116a in the track with the write element 121. If the HDC/MPU 23 writes three tracks of the cluster patterns 116a like the example of FIG. 5, after the HDC/MPU 23 has completed the writing of the second track of the cluster patterns 116a, at S34, the HDC/MPU 23 reduces the VCM current by $\Delta$I from (I1−$\Delta$I) for the writing of the next track, corresponding to the N branch off of S33. The pushing force of the actuator 16 decreases and the actuator 16 is moved further towards the outside diameter of the magnetic-recording disk 11 by the elastic force of the inner crash stop 171. At S32, the HDC/MPU 23 maintains the VCM current at the level I1−2$\Delta$I, and writes each cluster pattern 116a in the track with the write element 121.

With further reference to FIG. 6, in accordance with an embodiment of the present invention, after HDC/MPU 23 has written the three tracks of the cluster patterns 116a corresponding to the Y branch off of S33, at S35, the HDC/MPU 23 resets the setting of the VCM current to I1. At S36, the HDC/MPU 23 gradually reduces the VCM current from I1 to move the read element 122 slowly outward. Specifically, the HDC/MPU 23 provides VCM current decreasing in small increments. The HDC/MPU maintains each VCM current for longer than one disk rotation to attempt to lock the read element 122 on the cluster patterns 116a. If the read element 122 is successfully locked on the first track and positioned at the target position corresponding to the Y branch off of S37, at S38, the HDC/MPU 23 positions the read element 122 at the track and write the second cluster patterns 116*b* in the outer area. This process is similar to the process described in the discussion of FIG. 2. As the track ID is recorded in the first cluster patterns 116*a*, the HDC/MPU 23 is able to identify the on-going track by referring to the ID. If the read element 122 passes over the first track without being locked on it corresponding to the N branch off of S37, at S39, the HDC/MPU 23 decreases the VCM current to move the read element 122 outward. The HDC/MPU 23 may position the read element 122 at the target position in the second or third track almost without fail. If the read element 122 passes over all the tracks without reading out proper signals corresponding to the N branch off of S40, at S41, the passage of the read element 122 is processed as an error If the read element 122 is first positioned in the second or third track corresponding to the Y branch off of S40, at S38, the HDC/MPU 23 positions the read element 122 at the track and writes the second cluster patterns 116*b* in the outer area with the write element 121. Otherwise, after positioning the read element 122 at the second or third track, the HDC/MPU 23 may return the actuator 16 inward to search for the inner-most track. However, in an embodiment of the present invention, the process is so complicated that if the read element 122 is positioned at the second or the third track, the HDC/MPU 23 writes the second cluster patterns 116*b* at the track.

With further reference to FIG. 6, in accordance with an embodiment of the present invention, during SSW, an error may occur in the middle of the process and the HDC/MPU 23 restarts the process from the beginning. The HDC/MPU 23 starts the process from the initial patterns forming process. However, the initial patterns written previously remain on the magnetic-recording disk 11. The HDD 1 erases the remaining initial patterns. In another embodiment of the present invention, the HDD 1 erases the patterns remaining on the recording surface with the write element 121 of HDD 1, itself.

In accordance with embodiments of the present invention, the pattern erasure is affected by the write width; past patterns are erased without fail in the erasure of the initial patterns. Thus, an erasure operation with wider write width than that of the initial pattern write operation may provide a more reliable erasure of the past initial patterns. The HDC/MPU 23 may increase the write width by increasing the write current. For example, after moving the write element 121 to each target position, the HDC/MPU 23 carries out the pattern erasure before writing new patterns. The HDC/MPU 23 sets data in a register of the AE module 13 to control the write current of each write element, of which write element 121 is an example. After the pattern erasure, the HDC/MPU 23 sets the write current again and writes new patterns.

In another embodiment of the present invention, in the initial pattern forming process, before the writing of cluster patterns, the servo control supplies the set VCM currents to control the actuator. Therefore, the initial patterns may remain on the recording surface even if the write width in the pattern erasure is larger than that in the pattern writing. Under these circumstances, if the HDC/MPU 23 can distinguish the on-going patterns from the past patterns, the HDC/MPU 23 does not read the past patterns by mistake, and may write new initial patterns. To this end, in one embodiment of the present invention, the HDC/MPU 23 embeds an identifier in a cluster pattern which indicates that the cluster pattern is a new pattern written in the on-going operation. This identifier of initial pattern write operation may be a simple counter value, or a time stamp, in addition to, or instead of, a simple counter value. A time stamp is data for indicating the date, or alternatively, time, or both date and time. The time stamp allows the HDC/MPU 23 to identify the on-going patterns and use the on-going patterns as historical data of the writing operation. For example, the HDC/MPU 23 uses the month and the date, which is an example of a time stamp, of the initial pattern write operation and a counter value. The counter value indicates the number in the order of initial pattern write operations, which is how many times the initial pattern write operation was performed on a particular day of the month. Alternatively, data indicating the hour and the minute of the initial pattern write operation may be used as the time stamp. The HDC/MPU 23 stores the last identifier in a nonvolatile memory, other than magnetic-recording disks if it uses a counter value. The number and the positions of cluster patterns where the identifiers of the initial pattern write operation are written and the position of the identifier in a cluster pattern may be treated similarly to the track identifier of the cluster pattern. In another embodiment of the present invention, the track identifier and the identifier of the initial pattern write operation is recorded in the field of the track ID in the product servo pattern.

As set forth above, embodiments of the present invention have been described by way of example and not limitation thereto and may of course be modified in various ways within the spirit and scope of embodiments of the present invention. For example, embodiments of the present invention may be useful in HDDs; but, embodiments of the present invention may be applied to a disk drive using other kinds of disks. Embodiments of the present invention may be useful in the positioning at the first cluster patterns, but may also be applied to searching for other servo patterns of a track, when servo control is not available.

The foregoing descriptions of specific embodiments of the present invention have been presented for purposes of illustration and description. They are not intended to be exhaustive or to limit the invention to the precise forms disclosed, and many modifications and variations are possible in light of the above teaching. The embodiments described herein were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. A method for writing servo patterns onto a disk of a disk drive, said method comprising:
   providing a plurality of different drive currents for an actuator while pushing said actuator into a crash stop defining a swing range of said actuator;
   performing a write operation for at least one of said plurality of different drive currents with a write element to write a plurality of servo pattern tracks including a plurality of separate servo pattern sectors, wherein adjacent tracks in said plurality of servo pattern tracks are separated in a radial direction;
   writing an identifier in at least one of said plurality of servo pattern tracks, said identifier indicating that said servo pattern track is newly written in an on-going write process;
   changing gradually a drive current of said plurality of different drive currents while pushing said actuator into said crash stop so as to gradually move a read element in searching for a servo pattern track to a radial position different from a radial position of said write element; and positioning said read element at one of said plurality of servo pattern tracks.

2. The method of claim 1, further comprising:
writing new servo patterns with said write element while said write element is positioned at an inner edge of one of said plurality of servo pattern tracks.

3. The method of claim 1, further comprising:
writing new servo patterns with said write element while said write element is positioned at an outer edge of one of said plurality of servo pattern tracks.

4. The method of claim 1, further comprising:
writing an identifier for identifying said servo pattern track in at least one of said plurality of servo pattern tracks.

5. The method of claim 4, wherein at least one of said plurality of servo pattern sectors includes fields similar to a product servo pattern, and said identifier is written in a track identification field of at least one servo pattern sector.

6. The method of claim 1, wherein said identifier includes a time stamp.

7. The method of claim 1, wherein both an identifier for identifying said servo pattern track and said identifier indicating that said servo pattern track is newly written in said on-going write process are in one field of a servo pattern.

8. The method of claim 1, further comprising:
performing an erasure operation with said write element before writing at least one of said plurality of servo pattern tracks;
wherein a write width in said erasure operation is larger than a write width in said writing of said plurality of servo pattern tracks.

9. A disk drive comprising:
a disk;
a head comprising:
a write element configured to write servo patterns onto said disk, and
a read element configured to read said servo patterns;
an actuator configured to support said head and to rotate to move said head in a radial direction of said disk; and
a controller configured to write servo patterns onto said disk;
wherein said controller is configured to provide a plurality of different drive currents for said actuator while pushing said actuator into a crash stop defining a swing range of said actuator, is configured to perform a write operation for at least one of said plurality of different drive currents with said write element to write a plurality of servo pattern tracks including a plurality of separate servo pattern sectors, wherein adjacent tracks in said plurality of servo pattern tracks are separated in said radial direction, is configured to gradually change a drive current of said plurality of different drive currents while pushing said actuator into said crash stop so as to gradually move said read element in searching for a servo pattern track to a radial position different from a radial position of said write element, and is configured to position said read element at one of said plurality of servo pattern tracks;
wherein said disk drive is configured to write an identifier in at least one of said plurality of servo pattern tracks, said identifier indicating that said servo pattern track is newly written in an on-going write process.

10. The disk drive of claim 9, wherein said disk drive is configured to write new servo patterns with said write element while said write element is positioned at an inner edge of one of said plurality of servo pattern tracks.

11. The disk drive of claim 9, wherein said disk drive is configured to write new servo patterns with said write element while said write element is positioned at an outer edge of one of said plurality of servo pattern tracks.

12. The disk drive of claim 9, wherein said disk drive is configured to write an identifier for identifying said servo pattern track in at least one of said plurality of servo pattern tracks.

13. The disk drive of claim 12, wherein at least one of said plurality of servo pattern sectors includes fields similar to a product servo pattern, and said identifier is written in a track identification field of at least one servo pattern sector.

14. The disk drive of claim 9, wherein said identifier includes a time stamp.

15. The disk drive of claim 9, wherein both an identifier for identifying said servo pattern track and said identifier indicating that said servo pattern track is newly written in said on-going write process are in one field of a servo pattern.

16. The disk drive of claim 9, wherein said disk drive is configured to perform an erasure operation with said write element before writing at least one of said plurality of servo pattern tracks, and a write width in said erasure operation is larger than a write width in said writing of said plurality of servo pattern tracks.

* * * * *